United States Patent Office 3,377,397
Patented Apr. 9, 1968

3,377,397
DIMERIZATION OF DIOLEFINS
Perry L. Maxfield, Bartlesville, Okla., assignor to Phillips Petroleum Company, a corporation of Delaware
No Drawing. Filed Oct. 22, 1965, Ser. No. 502,481
15 Claims. (Cl. 260—666)

ABSTRACT OF THE DISCLOSURE

Diolefin such as butadiene is dimerized using a dinitrosile halide, an organometallic reducing agent, such as a Grignard reagent, and organo non-metal.

This invention relates to dimerization methods and catalysts for effecting dimerization.

Heretofore, conjugated dienes have been dimerized by thermal, non-catalytic techniques. However, these techniques have yielded besides the desired dimer a wide variety of by-products and other polymers which substantially reduce the ultimate yields of the desired dimer.

Quite surprisingly, it has now been found that butadiene, isoprene, and mixtures of these dienes can be dimerized in substantial quantities under mild dimerization conditions by contacting same with a catalyst formed on mixing a dinitrosyliron halide, a reducing agent as hereinafter defined, and a third component as hereinafter defined.

The catalyst of this invention is that formed upon mixing dinitrosyliron halide with a reducing agent and said third material.

Accordingly, it is an object of this invention to provide a new and improved method for dimerizing conjugated dienes. It is another object of this invention to provide a new and improved catalyst useful for dimerization of conjugated dienes.

According to this invention, butadiene, isoprene and mixtures thereof are dimerized with a catalyst formed on admixing a dinitrosyliron halide wherein the halogen is preferably one of chlorine, bromine, and iodine, with a reducing agent selected from the group consisting of Grignard reagents having the formula RMgX, organoalkali metals having the formula RM, zinc and cadmium organometals of the type $(R)_2Zn$ and $(R)_2Cd$, and organoaluminum compounds having the formulas $(R)_2AlOR$ and $R_3Al$, preferred are RMgX and RM, in the presence of a third component selected from the group consisting of acyclic and cyclic ethers having from 2 to 8 carbon atoms per molecule, stibines of the formula $(R)_3Sb$, arsines of the formula $(R)_3As$, phosphines of the formula $(R)_3P$, phosphine oxides of the formula $(R)_3P=O$, sulfides of the formula $(R)_2S$, heterocyclic nitrogen compounds having from 4 to 10 carbon atoms per molecule and heterocyclic sulfide compounds having 3 to 8 carbon atoms per molecule, preferably the ethers, stibines, arsines, sulfides, heterocyclic nitrogen compounds, and heterocyclic sulfide compounds, wherein each R contains from 1 to 12, preferably 1 to 7, carbon atoms and is at least one radical selected from the group consisting of alkyl, alkenyl, aryl, cycloalkyl, and combinations thereof, preferably alkyl, alkenyl, and aryl, and wherein X is selected from the group consisting of chlorine, bromine, and iodine, and wherein the alkali metal (M) is one selected from the group consisting of lithium, sodium, potassium, rubidium, and cesium, preferably lithium.

The dinitrosyliron halides of this invention have the formula $Fe(NO)_2X$ wherein X is the halide and can be formed in any conventional manner. Some dinitrosyliron halides are believed to exist in dimeric and possibly other polymeric forms. However, for purpose of this invention, particularly in regard to molar calculations, the dinitrosyliron halides are considered to be monomeric having but one atom of iron per molecule.

For example, iron dicarbonyl dinitrosyl can be reacted with a halogen to form the dinitrosyliron halide as discussed in Chemical Abstracts, volume 27, 2646, (1933). The iron dicarbonyl dinitrosyl can be formed by reacting iron pentacarbonyl with nitric oxide as disclosed in Chemistry of Organic Compounds by Carl R. Noller, second edition, p. 905, W. B. Saunders Company, (1957).

The reducing agents of this invention are conventional and well known materials which are available commercially and therefore will not be described in detail.

Some examples of reducing agents that can be employed in the catalyst system include methylmagnesium chloride,
ethylmagnesium bromide,
n-butylmagnesium iodide,
allylmagnesium bromide,
phenylmagnesium chloride,
p-tolylmagnesium iodide,
cyclohexylmagnesium bromide,
n-dodecylmagnesium iodide,
α-naphthylmagnesium chloride,
cyclooctylmagnesium chloride,
cyclooctylmagnesium bromide,
4-phenylcyclohexylmagnesium iodide,
ethyllithium,
n-butyllithium,
n-amyllithium,
n-dodecyllithium,
phenylpotassium,
cyclohexyllithium,
n-octylcesium,
n-dodecylrubidium,
benzylsodium,
allylsodium,
diethylzinc,
diallylzinc,
dicycloheptylzinc,
diphenylzinc,
di-n-butylcadmium,
diallylcadmium,
dicyclooctylcadmium,
dibenzylcadmium,
dimethylmethoxyaluminum,
diethylethoxyaluminum,
diallylpropoxyaluminum,
diphenylphenoxyaluminum,
diethylcyclohexoxyaluminum,
di-n-dodecylethoxyaluminum,
dicyclohexylphenoxyaluminum,
triethylaluminum,
tricyclopentylaluminum,
triphenylaluminum,
triallylaluminum, and the like.

The ethers according to this invention can be either cyclic or acyclic ethers and include such materials as methyl ether, ethyl ether, methyl ethyl ether, n-butyl ether, isopentyl ether, propyl hexyl ether, cyclohexyl ether, cyclohexyl ethyl ether, allylether, phenylether, tetrahydrofuran, p-dioxane, and the like.

Representative stibines include trimethylstibine, triethylstibine, trihexylstibine, tri-n-dodecylstibine, triphenylstibine, diphenylethylstibine, tricyclohexylstibine, triallylstibine, triphenylstibine, and the like.

Representative arsines include trimethylarsine, tripentylarsine, tri-n-dodecylarsine, tri(p-tolyl)arsine, triphenylarsine, tri-α-naphthylarsine, diphenylbutylarsine, tricyclohexylarsine, tri(2-hexenyl)arsine, triallylarsine, and the like.

Representative phosphines include triethylphosphine, tri-n-butylphosphine, tridecylphosphine, triphenylphosphine, tri-β-naphthylphosphine, diphenylisopentylphosphine, triallylphosphine, tricyclohexylphosphine, and the like.

Representative phosphine oxides include triethylphosphine oxide, tri-n-butylphosphine oxide, tri-n-decylphosphine oxide, diphenylisopentylphosphine oxide, triallylphosphine oxide, tricyclohexylphosphine oxide, and the like.

Representative sulfides include dimethyl sulfide, di-n-butyl sulfide, di-n-dodecyl sulfide, dicyclohexyl sulfide, diphenyl sulfide, di-β-naphthyl sulfide, cyclohexyl ethyl sulfide, diallylsulfide, and the like.

Representative heterocyclic nitrogen compounds include pyridine, quinoline, quinaldine, and the like. The heterocyclic nitrogen compounds employed can also contain alkyl substituents. For example, 2-methyl-5-ethylpyridine, and the like.

Representative heterocyclic sulfide compounds include thiophene, benzothiophene, and the like. The heterocyclic sulfide compounds can also contain alkyl substituents. For example, 2-methyl-5-butylthiophene, 2-isopropyl-3,4-dimethylthiophene, and the like.

In forming he active catalyst the dinitrosyliron halide is contacted with at least one of the above reducing agents in the presence of at least one of the above-described third materials, the third material preferably being present before addition of the reducing agent. Other than this, any order of addition can be used. The catalyst components can also be combined, if desired, in the presence of the diene monomer. About 0.01 to about 10, preferably about 1 to about 4, moles of reducing agent per mole of dinitrosyliron halide can be employed. Formation of the catalyst can be carried out in a reaction vessel under autogenous or higher pressures if desired and in an inert atmosphere such as nitrogen, argon, and the like. The reaction vessel employed to form the catalyst can also be employed for the dimerization reaction if desired. The temperature during the catalyst formation can vary over a wide range but will usually fall within the range of from about −78° C. (Dry Ice temperature) to about 25° C. The time for formation of the catalyst will be on the order of a few minutes, e.g. 3 minutes, up to 10 hours. The temperature and time used during the catalyst formation will depend upon several variables including the particular materials employed. An ethereal third compound can be used at lower temperatures than other above-disclosed third compounds. The other third compounds can be generally employed in the order of ascending temperatures for stibines, arsines, sulfides, and the like. The reduction of the dinitrosyliron halide in the presence of the third component can be effected in the presence or absence of the conjugated diene to be dimerized although it is preferred to effect the reduction of the absence of the diene, or at most, in the presence of only a minor amount of diene. The amount of the third component present during the reduction will vary from about 0.01 to about 100 or more, preferably from about 0.1 to about 3, moles per mole of reducing agent, depending upon the specific compound used; for example, more active compounds such as triphenylstibine, triphenylarsine, and thiophene, can be effectively employed as low as about 0.1:1 third component to reducing agent ratio. Other compounds such as tetrahydrofuran and the lower alkyl ethers can be used in much greater proportions such that they may also serve as convenient diluents for the reactants.

After the active catalyst is formed the conjugated diene can be dimerized in the presence of this catalyst at relatively mild temperatures for dimerization purposes. Generally, the temperature for dimerization will be from about 0 to about 100° C. Higher temperatures can lead to the formation of substantial amounts of higher molecular weight polymers. The reaction time for the dimerization process can vary widely but will generally be from a few minutes, e.g. 3 minutes, to 24 hours or more. The conversion can be carried out in either the presence or absence of an inert diluent, and cyclic and acyclic paraffinic materials having up to about 20 carbon atoms per molecule can be used for this purpose. Generally, the reaction time is quite low since the catalysts of this invention are very active even at low temperatures. The dimerization can be carried out in a batch process or continuous process or even a semi-continuous process wherein butadiene is intermittently charged as needed to replace that already dimerized.

At the end of the dimerization reaction, the dimer can be recovered by conventional methods well known in the art such as fractional distillation, solvent extraction, adsorption techniques, and the like.

It is important to note that this invention, unlike other catalytic butadiene oligomerization reactions, converts butadiene substantially quantitatively to 4-vinylcyclohexene without the production of substantially any other products. In addition to the feature of very substantial ultimate yields of the dimer, high conversion and high productivity in pounds of product per pound of catalyst are realized by this invention. Furthermore, the reaction is carried out at mild temperature conditions, thereby avoiding thermal polymerization and/or cracking or other deleterious effects on the dimer product.

Example I

A series of runs was carried out in which butadiene was converted to 4-vinylcyclohexene. In each of these runs 2 to 3 ounces of butadiene and the desired amount of dinitrosyliron chloride were charged to a Parr hydrogenation bottle which was cooled in a Dry Ice acetone bath. In the runs employing solutions of dinitrosyliron chloride in tetrahydrofuran, the solution contained 2.4 millimoles of iron per milliliter of solution. The reducing agents used in these runs were Grignard reagents which were added to the reaction bottles at Dry Ice acetone temperature, i.e. −78° C. While stirring, the reduction mixture was allowed to warm to 20 to 30° C., and this dimerization temperature was maintained by means of a constant temperature bath. Gaseous butadiene was fed into the reaction vessel at about the same rate at which it was consumed by the dimerization reaction. The results of these runs are shown in Table I.

TABLE I

| Run No. | Butadiene (g.) | Fe(NO)$_2$Cl (millimoles) | Reducing Agent (millimoles) | Third Component [5] (millimoles) | Reaction Time (hours) | 4-vinylcyclohexene Yield, percent |
|---|---|---|---|---|---|---|
| 1 | 271 | [1] 4.8 | Allyl MgBr [3] (4.8) | Tetrahydrofuran (~24) | 8 | 99 |
| 2 | 256 | [2] 1.2 | Phenyl MgBr [4] (3) | Tetrahydrofuran (111) | 5 | 98 |
| 3 | 287 | [2] 1.2 | ----do---- | ----do---- | 5 | 99 |

[1] Added in the form of 2 ml. of tetrahydrofuran solution containing 2.4 millimoles of iron per ml. prepared by reducing ferric chloride with metallic iron in tetrahydrofuran followed by addition of a stoichiometric amount of nitric oxide to the mixture under reflux.
[2] Added in form of sublimed solid (0.18 g.).
[3] 4 ml. of 1.2 molar allylmagnesium bromide in ethyl ether.
[4] 1 ml. of 3 molar phenylmagnesium bromide in ethyl ether.
[5] Not including the ethyl ether solvent for the Grignard reducing agent which ether also can function as a third component.

These data show that at the low reaction temperatures 20 to 30° C. yields of 98–99 weight percent 4-vinylcyclohexene were obtained by dimerizing butadiene in the presence of the catalyst of this invention.

Example II

Three runs were carried out in 12 ounce bottles, and in each run the bottle was charged with sublimed dinitrosyliron chloride and the third component and then filled approximately ½ full with butadiene. The reducing agent was then added to the reaction vessel while the mixture was maintained at a temperature of from 10 to 20° C. The remainder of the butadienes was then fed into the reaction vessel as a gas while maintaining the mixture at from 25 to 40° C. to effect dimerization. In every run, 4-vinylcyclohexene was the only product, and a vacuum formed during each run. This indicated yields of 98 to 99 percent of 4-vinylcyclohexene. The results of these runs are expressed in Table 2.

TABLE 2

| Run No. | $Fe(NO)_2Cl$ (millimoles) | Reducing Agent (millimoles) | Third Component [3] (millimoles) | Reaction Time (hours) | 4-vinylcyclohexene (g.) |
|---|---|---|---|---|---|
| 4 | 1.2 | Phenyl MgBr [1] (4.5) | Triphenylarsine (0.8) | 6 | 352 |
| 5 | 1.2 | ....do.... | Triphenylstibine (0.7) | 4 | 345 |
| 6 | 1.2 | Butyllithium [2] (~1.3) | ....do.... | 6 | 320 |

[1] 1.5 ml. of 3 molar phenylmagnesium bromide in ethyl ether.
[2] 14 weight percent butyllithium in n-heptane.
[3] Not including the ether used as solvent for the Grignard reducing agent which ether also can function as a third component.

These data show that at mild temperatures arsines and stibines can be used as the third component in the catalyst system. An organoalkali metal can be employed as the reducing agent to obtain substantially quantitative yields of 4-vinylcyclohexene from butadiene.

Example III

Two runs were carried out utilizing pyridine and diphenyl sulfide as the third component, respectively. In these runs 12 ounce aerosol bottles were charged with the third material, and sublimed dinitrosyliron chloride, and then filled approximately ½ full with butadiene. The reducing agent, phenylmagnesium bromide, was then added to the reaction vessel while the mixture was maintained at a temperature ranging from 10 to 20° C. The remainder of the butadiene was then added to the reaction vessel as a gas while maintaining the mixture at a temperature of from 25 to 35° C. to effect dimerization. Again, substantially quantitative ultimate yields of 4-vinylcyclohexene were obtained. The results of these runs are expressed in Table 3.

TABLE 3

| Run No. | $Fe(NO)_2Cl$ (millimoles) | Reducing Agent (millimoles) | Third Component [2] (millimoles) | Reaction Time (hours) | 4-vinylcyclohexene (g.) |
|---|---|---|---|---|---|
| 7 | 1.2 | Phenyl MgBr [1] (4.5) | Pyridine (6.2) | 10 | 140 |
| 8 | 1.2 | ....do.... | Diphenyl Sulfide (3.0) | 5 | 318 |

[1] 1.5 ml. of 3 molar phenylmagnesium bromide in ethyl ether.
[2] Not including the ether used as diluent for the Grignard reducing agent which can also function as a third component.

These data show that at mild temperatures heterocyclic nitrogen compounds and organo-sulfide compounds can be employed to obtain substantial amounts of 4-vinylcyclohexene.

Example IV

Three runs were carried out in which the catalyst components were charged as follows and in the order given: 5 milliliters of benzene, 2 milliliters of a tetrahydrofuran solution of dinitrosyliron chloride containing 2.4 millimoles of iron per milliliter of solution, the third compound, and 1 milliliter of 3 molar solution of phenyl magnesium bromide in ethyl ether.

The catalyst was formed at a temperature of from 0 to 15° C. after which it was added to butadiene in a 12 ounce bottle about half full of butadiene maintained at from 30 to 35° C. in a controlled temperature bath. Gaseous butadiene was then fed into the reaction vessel as it was used. This is shown in Table 4.

TABLE 4

| Run No. | $Fe(NO)_2Cl$ (millimoles) | Reducing Agent (millimoles) | Third Component [2] (millimoles) | Reaction Time (hours) | 4-vinylcyclohexene (g.) | Yield Percent [3] |
|---|---|---|---|---|---|---|
| 9 | 4.8 | Phenyl MgBr (3) | Thiophene (5.1) | 6 | 243 | 99+ |
| 10 | 4.8 | ....do.... | Dibutyl Sulfide (2.3) | 6 | 275 | 99+ |
| 11 | [1] 1.0 | ....do.... | Triphenylstibine (0.8) | 7 | 353 | 99+ |

[1] 0.15 g. of $Fe(NO)_2Cl$ in 10 ml. tetrahydrofuran used in this run.
[2] Not including the ether solvent for the reducing agent or the tetrahydrofuarn solvent for the $Fe(NO)_2Cl$ which solvent can also function as a third component.
[3] By GLC estimate of residual batadiene.

These data show that at mild temperatures heterocyclic sulfur compounds as well as dialkyl sulfides and triphenyl stibines can be used in obtaining substantially quantitative yields of 4-vinylcyclohexene.

Example V

Five milliliters of a tetrahydrofuran solution of dinitrosyliron chloride containing 2.4 millimoles of iron per milliliter of solution, and 10 milliliters of benzene were charged into a 1-liter autoclave at −15° C. along with 134 grams of butadiene. To this mixture was added 8 milliliters of 1.2 molar allyl magnesium bromide in ethyl ether. The autoclave was then warmed to 40° C. and an exothermic reaction occurred within ½ hour which caused the temperature to rise to 80° C. After 2 hours, the reaction vessel was cooled and the contents removed and distilled to yield 66 grams of 4-vinylcyclohexene, the remainder being substantially unreacted butadiene.

This example shows that at the higher temperature the yield of product was reduced.

Example VI

In this example 1.5 milliliters of a tetrahydrofuran solution of dinitrosyliron chloride containing 2.4 millimoles of iron per milliliter of solution was charged to a Diels-Alder tube and contacted with 2 milliliters of 1.2 molar solution of allyl magnesium bromide in ether at −78° C. At this time, 25 milliliters of isoprene and 27 grams of butadiene were charged to the reaction tube, and the mixture was allowed to warm to room temperature. Separation of the reaction mixture yielded 9.6 grams of 4-vinylcyclohexene, 4.8 grams of 1,4-dimethyl-4-vinylcyclohexene and a trace of limonene. Two to three grams of 1-methyl-4-vinylcyclohexene, the codimer of isoprene and butadiene was also obtained.

Thus, mixtures of butadiene and isoprene can be treated according to this invention.

Example VII

A mixture of 20 milliliters of isoprene, 0.37 gram of dinitrosyliron chloride, 0.5 gram of triphenylstibine, 5 milliliters of benzene, and 3 milliliters of tetrahydrofuran was cooled to −78° C. To this mixture was added 1 milliliter of a 3 molar solution of phenyl magnesium bromide and ethyl ether. The mixture was refluxed at 35° C. for 6 hours under nitrogen. Thereafter distillation of the mixture yields 5 grams of 1,4-dimethyl-4-vinylcyclohexene and a trace of limonene.

These data show that isoprene can be dimerized according to this invention under mild conditions.

Reasonable variations and modifications are possible within the scope of this disclosure without departing from the spirit and scope thereof.

I claim:

1. A method of dimerizing at least one compound selected from the group consisting of butadiene and isoprene comprising contacting said at least one compound at a temperature in the range of from about 0 to about 100° C. with a catalyst formed on admixing dinitrosyliron halide, a reducing agent selected from the group consisting of Grignard reagents having the formula RMgX, organoalkali metal having the formula RM, organozinc and organocadmium compounds of the formulas $(R)_2Zn$ and $(R)_2Cd$, and organo-aluminum compounds having the formulas $R_2AlOR$ and $R_3Al$, and a compound selected from the group consisting of ethers having from 2 to 6 carbon atoms per molecule, stibines of the formula $(R)_3Sb$, arsines of the formula $(R)_3As$, phosphines of the formula $(R)_3P$, phosphine oxides of the formula $(R)_3PO$, sulfides of the formula $(R)_2S$, heterocyclic nitrogen compounds having from 4 to 10 carbon atoms per molecule, and heterocyclic sulfur compounds having from 3 to 8 carbon atoms per molecule, wherein each R in the above formulas contains from 1 to 12 carbon atoms and is a radical selected from the group consisting of alkyl, alkenyl, aryl, cycloalkyl, and combinations thereof, and wherein X is a halide, and recovering the dimerization products.

2. The method according to claim 1 wherein from about 0.01 to about 10 moles of reducing agent is employed per mole of dinitrosyliron halide and wherein from about 0.01 to about 100 moles of said compound are employed per mole of reducing agent.

3. A method of dimerizing at least one compound selected from the group consisting of butadiene and isoprene comprising contacting said at least one compound at a temperature in the range of from about 0 to about 100° C. with the catalyst formed on admixing dinitrosyliron halide wherein the halide is selected from the group consisting of chlorine, bromine, and iodine, a reducing agent selected from the group consisting of Grignard reagents having the formula RMgX and organoalkali metal having the formula RM, and a compound selected from the group consisting of ethers having from 2 to 6 carbon atoms per molecule, stibines of the formula $(R)_3Sb$, arsines of the formula $(R)_3As$, sulfides of the formula $(R)_2S$, heterocyclic nitrogen compounds having from 4 to 10 carbon atoms per molecule, and heterocyclic sulfide compounds having from 3 to 8 carbon atoms per molecule, wherein the R in the above formulas contains from 1 to 12 carbon atoms and is a radical selected from the group consisting of alkyl, alkenyl, aryl, cycloalkyl, and combinations thereof, wherein X is a halogen, and wherein the alkali metal is one selected from the group consisting of lithium, sodium, potassium, rubidium, and cesium, and recovering the dimerization products.

4. A method of dimerizing at least one compound selected from the group consisting of butadiene and isoprene comprising contacting said at least one compound at a temperature of from about 0 to about 100° C. with a catalyst formed on admixing dinitrosyliron chloride, a compound selected from the group consisting of allyl magnesium halide and phenyl magnesium halide wherein the halide is selected from the group consisting of chlorine, bromine, and iodine, and at least one compound selected from the group consisting of tetrahydrofuran, triphenylstibine, triphenylarsine, diphenyl sulfide, dibutyl sulfide, pyridine, or thiophene, and recovering the dimerization products.

5. The method according to claim 4 wherein the compound dimerized is butadiene.

6. A method of dimerizing at least one compound selected from the group consisting of butadiene and isoprene comprising contacting said at least one compound at a temperature in the range of from about 0 to about 100° C. with a catalyst formed on admixing dinitrosyliron chloride, butyllithium, and a third compound selected from the group consisting of tetrahydrofuran, triphenylstibine, triphenylarsine, diphenyl sulfide, dibutyl sulfide, pyridine, and thiophene, and recovering the dimerization products.

7. The method according to claim 6 wherein said compound dimerized is butadiene.

8. A method of dimerizing butadiene comprising contacting butadiene at a temperature of from about 0 to about 100° C. with a catalyst formed on admixing dinitrosyliron halide wherein the halide is selected from the group consisting of chlorine, bromine, and iodine, allyl magnesium bromide, and tetrahydrofuran, and recovering the dimerization products.

9. A method of dimerizing butadiene comprising contacting butadiene at a temperature of from about 0 to about 100° C. with a catalyst formed on admixing dinitrosyliron halide wherein the halide is selected from the group consisting of chlorine, bromine, and iodine, phenyl magnesium bromide, and tetrahydrofuran, and recovering the dimerization products.

10. The method according to claim 9 wherein said dinitrosyliron halide is dinitrosyliron chloride.

11. A method of dimerizing butadiene by contacting same at a temperature of from about 0 to about 100° C. with a catalyst formed on admixing dinitrosyliron halide wherein the halide is selected from the group consisting of chlorine, bromine, and iodine, phenyl magnesium bromide, and a material selected from the group consisting of triphenylarsine, triphenyl stibine, pyridine, and diphenyl sulfide, and recovering the dimerization products.

12. A method for dimerizing butadiene comprising contacting same at a temperature of from about 0 to about 100° C. with a catalyst formed on mixing dinitrosyliron halide wherein the halide is selected from the group consisting of chlorine, bromine, and iodine, butyllithium, and triphenylstibine, and recovering the dimerization products.

13. A catalyst consisting essentially of the product formed on mixing dinitrosyliron halide wherein the halide is selected from the group consisting of chlorine, bromine, and iodine, a reducing agent selected from the group consisting of Grignard reagents having the formula RMgX, organoaluminum compounds having the formula $R_2AlOR$, and organoalkali metal having the formula RM, and a compound selected from the group consisting of ethers having from 2 to 6 carbon atoms per molecule, stibines of the formula $(R)_3Sb$, arsines of the formula $(R)_3As$, sulfiides of the formula $(R)_2S$, heterocyclic nitrogen compounds having from 4 to 10 carbon atoms per molecule, and heterocyclic sulfide compounds having from 3 to 8 carbon atoms per molecule, wherein the R in the above formulas contains from 1 to 12 carbon atoms and is a radical selected from the group consisting of alkyl, alkenyl, aryl, cycloalkyl, and combinations thereof, wherein X is a halogen, and wherein the alkali metal is one selected from the group consisting of lithium, sodium, potassium, rubidium, and cesium.

14. A butadiene and isoprene dimerization catalyst consisting essentially of the product formed on mixing at a temperature of from about −78 to about 25° C. dinitrosyliron halide, a compound selected from the group consisting of allyl magnesium halide and phenyl magnesium halide wherein the halide is selected from the group consisting of chlorine, bromine, and iodine, and at least one of tetrahydrofuran, triphenylstibine, triphenylarsine, diphenyl sulfide, dibutyl sulfide, pyridine, and thiophene.

15. A catalyst consisting essentially of the product formed on mixing at a temperature of from about −78° C. to about 25° C. dinitrosyliron halide, butyllithium, and a third compound selected from the group consisting of tetrahydrofuran, triphenylstibine, triphenylarsine, diphenyl sulfide, dibutyl sulfide, pyridine, and thiophene.

References Cited

UNITED STATES PATENTS

| | | | | |
|---|---|---|---|---|
| 2,600,571 | 6/1952 | Prichard | | 260—439 |
| 2,865,707 | 12/1958 | Hogsed | | 260—439 |

OTHER REFERENCES

Von W. Hieber et al.: "Zeit. Anorg. Allgem. Chem.," 321, pp. 94–106, 1963.

Von W. Huber and W. Beck: "Zeit. Naturforschung, Bd. 13B," pp. 194–5, 1958.

DELBERT E. GANTZ, *Primary Examiner.*

PAUL M. COUGHLAN, JR., *Examiner.*

V. O'KEEFE, *Assistant Examiner.*